United States Patent
Hussain et al.

(10) Patent No.: US 8,122,274 B2
(45) Date of Patent: Feb. 21, 2012

(54) METHOD, SYSTEM AND COMPUTER PROGRAM PRODUCT FOR CERTIFYING A TIMESTAMP OF A DATA PROCESSING SYSTEM

(75) Inventors: Riaz Y. Hussain, Austin, TX (US); Phani Gopal V. Achanta, Austin, TX (US); Frank Eliot Levine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 12/394,521

(22) Filed: Feb. 27, 2009

(65) Prior Publication Data
US 2010/0223241 A1  Sep. 2, 2010

(51) Int. Cl.
*G06F 1/00* (2006.01)
(52) U.S. Cl. .................. 713/400; 713/503
(58) Field of Classification Search ............ 713/400, 713/500, 503; 726/3, 17–19, 27
See application file for complete search history.

(56) References Cited

U.S. PATENT DOCUMENTS

| | | | |
|---|---|---|---|
| 5,343,527 A | 8/1994 | Moore | |
| 6,185,678 B1 * | 2/2001 | Arbaugh et al. | 713/2 |
| 6,874,089 B2 * | 3/2005 | Dick et al. | 726/14 |
| 6,886,099 B1 | 4/2005 | Smithson et al. | |
| 7,228,426 B2 | 6/2007 | Sinha et al. | |
| 7,266,685 B1 * | 9/2007 | Meandzija et al. | 713/156 |
| 7,370,357 B2 | 5/2008 | Sekar | |
| 2007/0107052 A1 | 5/2007 | Cangini et al. | |
| 2008/0021922 A1 | 1/2008 | Hailpern et al. | |
| 2008/0201580 A1 * | 8/2008 | Savitzky et al. | 713/189 |
| 2008/0270372 A1 * | 10/2008 | Hsu et al. | 707/4 |
| 2010/0106974 A1 * | 4/2010 | Aguilera et al. | 713/179 |

FOREIGN PATENT DOCUMENTS
JP  09171460  6/1997
* cited by examiner

*Primary Examiner* — Glenn A Auve
(74) *Attorney, Agent, or Firm* — James L. Baudino; David A. Mims, Jr.

(57) ABSTRACT

The disclosed embodiments present a system, method, and computer program product for certifying a timestamp generated by a data processing system. In some embodiments, the method includes receiving a request to certify a timestamp generated by a trusted data processing system, analyzing historical data related to a system time of the data processing system, and certifying the timestamp in response to determining that the historical data indicates a trustworthy system time of the data processing system when the timestamp was generated.

24 Claims, 5 Drawing Sheets

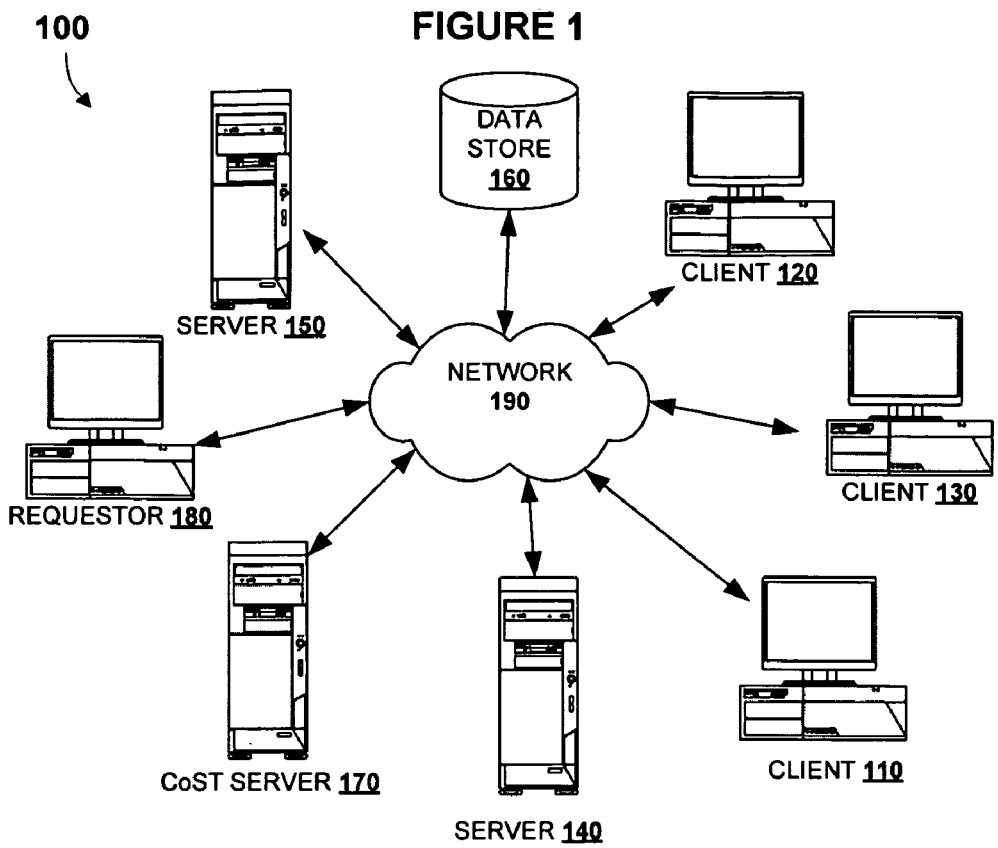
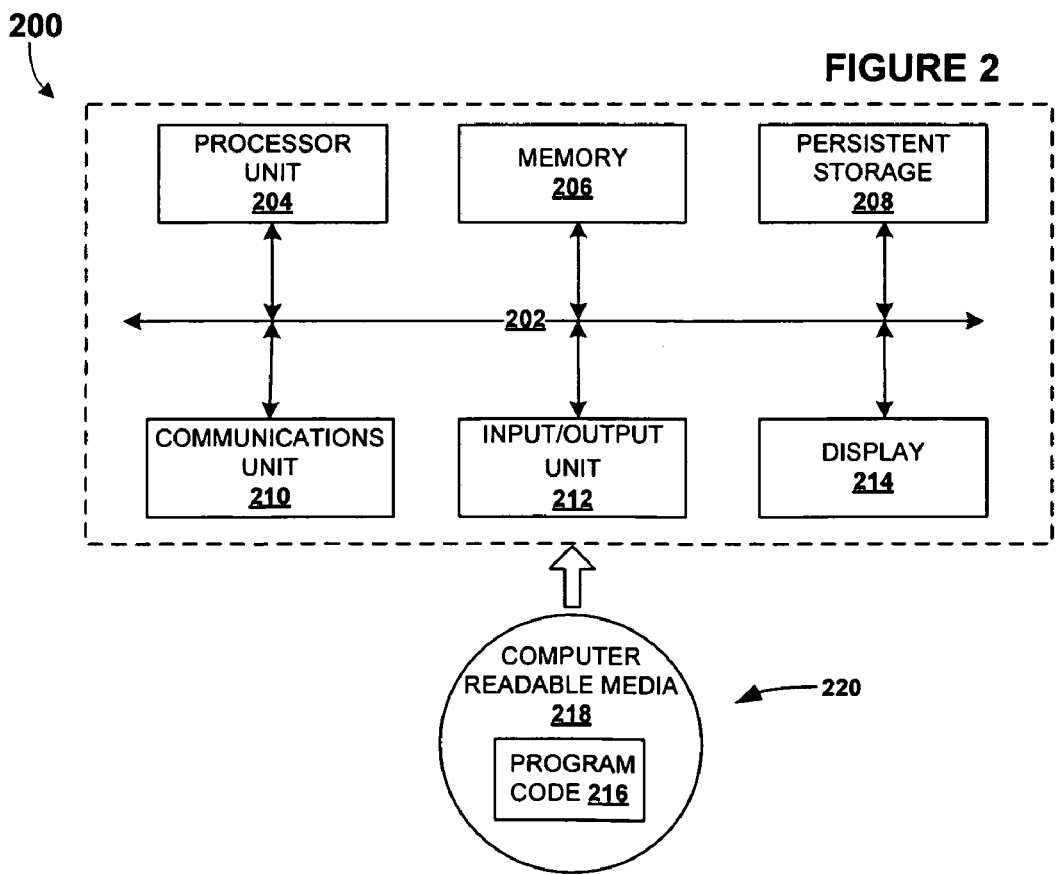

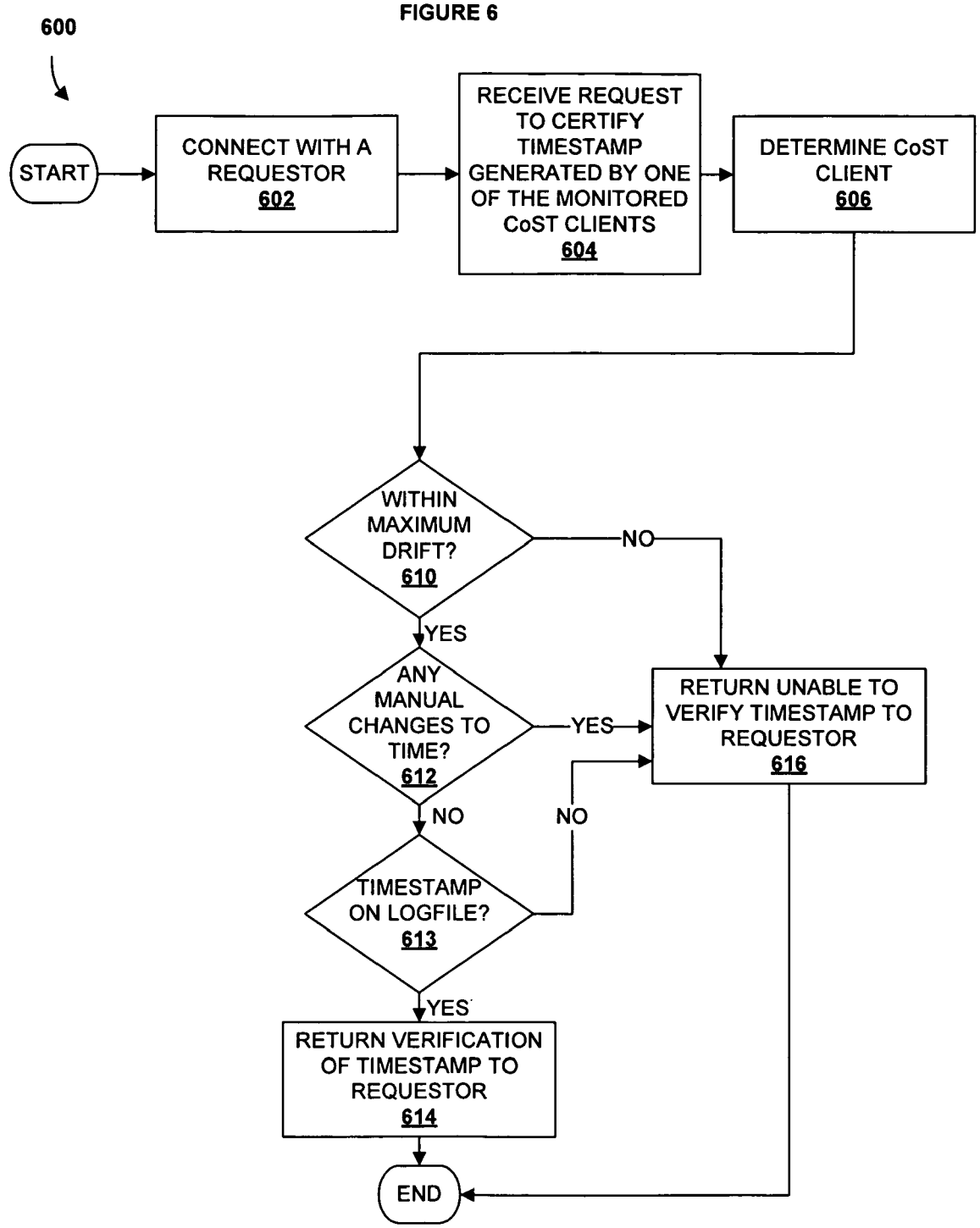

METHOD, SYSTEM AND COMPUTER PROGRAM PRODUCT FOR CERTIFYING A TIMESTAMP OF A DATA PROCESSING SYSTEM

BACKGROUND

The system time of a data processing system is measured by a system clock, which is typically implemented as a simple count of the number of ticks/interrupts that have transpired since some arbitrary starting date and time. The system time may be inaccurate for several reasons. For example, the stability of the interrupt requests may drift over a period of time, thereby altering the rate of interrupts. Thus, the system time may drift and be inaccurate. However, in some data processing systems, it may be important to ensure the accuracy of the system time. For example, it may be important to maintain a certified system time to ensure that certain computer processes are performed at a precise time. In addition, because file systems keep track of the times that files are created, modified, and/or accessed by storing timestamps in the file control block of each file using the system time, an accurate system time is required to ensure the accuracy of the timestamps.

SUMMARY

According to one embodiment of the present invention, a method for certifying a timestamp generated by a data processing system is disclosed. In some embodiments, the method includes receiving a request to certify a timestamp generated by a trusted data processing system, analyzing historical data related to a system time of the data processing system, and certifying the timestamp in response to determining that the historical data indicates a trustworthy system time of the data processing system when the timestamp was generated.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which:

FIG. 1 is an embodiment of network of data processing systems in which the illustrative embodiments may be implemented;

FIG. 2 is an embodiment of a data processing system in which the illustrative embodiments may be implemented;

FIG. 6 is an embodiment of a process for certifying a timestamp generated by a monitored data processing system.

DETAILED DESCRIPTION

Figure 3:
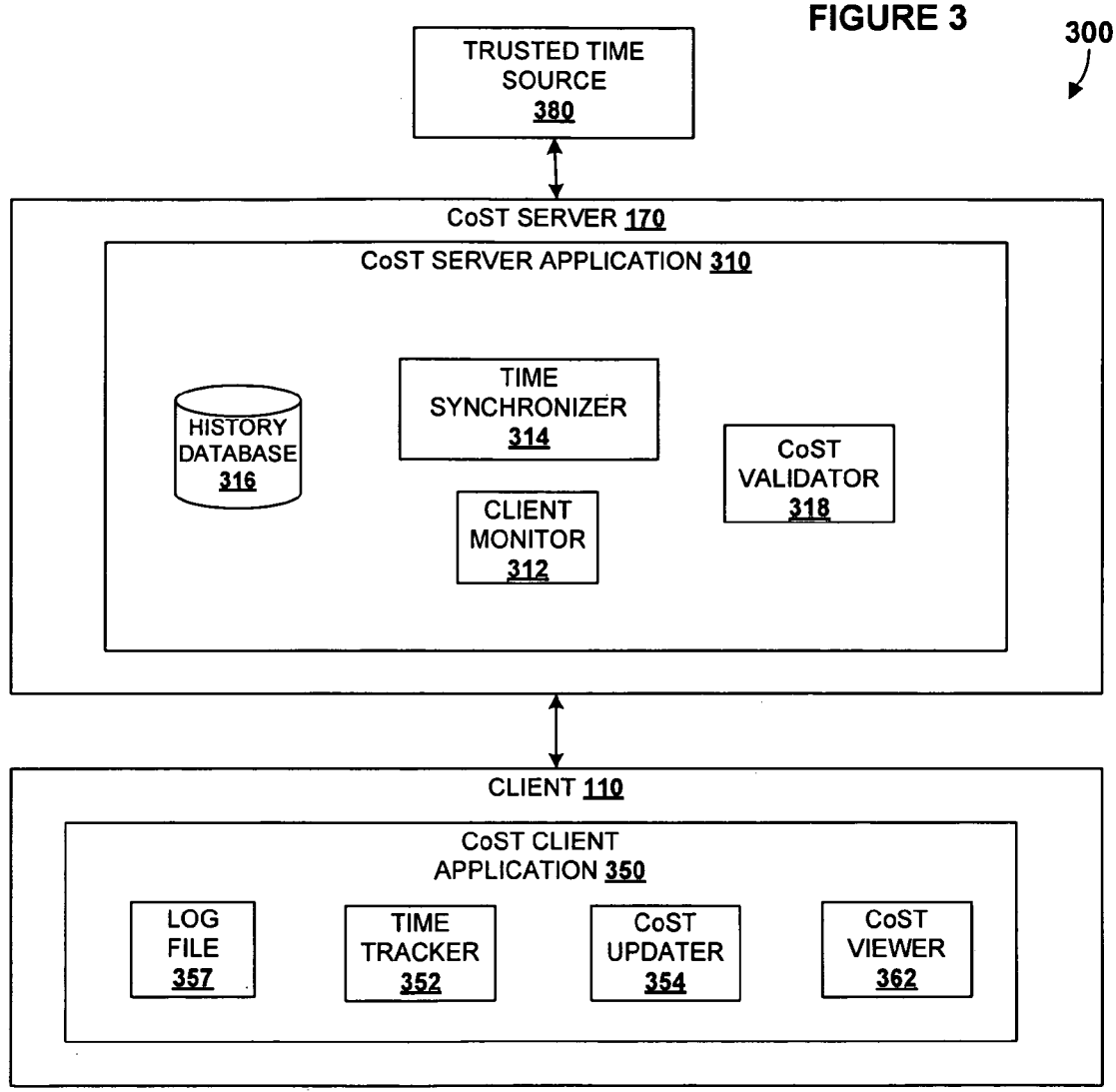
FIG. 3 is an embodiment of a certification of system time application.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a network data processing system 100 in which illustrative embodiments may be implemented. Network data processing system 100 contains network 190, which is the medium used to provide communications links between various devices and computers connected together within network data processing system 100. Network 190 may include connections, such as wire, wireless communication links, or fiber optic cables.

In some embodiments, server 140 and server 150 connect to network 190 along with data store 160. Server 140 and server 150 may be, for example, IBM System p® servers. In addition, clients 110, 120, and 130 connect to network 190. Clients 110, 120, and 130 may be, for example, personal computers or network computers. In the depicted example, server 140 provides data and/or services such as, but not limited to, data files, applications, and web services to clients 110, 120, and 130. Network data processing system 100 may include additional servers, clients, and other devices not shown.

As will be further described, the disclosed embodiments may be implemented in a data processing system such as, but not limited to, certification of system time (CoST) server 170. CoST server 170 also connects to network 190 and provides and/or identifies data processing systems having certified system times to a requester such as, but not limited to, requester 180. For example, in some embodiments, CoST server 170 may monitor and verify the accuracy of the system times of clients 110, 120, and 130. Upon receiving a request from requester 180 for a data processing system having a certified system time meeting a certain criteria such as, but not limited to, a system time within a maximum drift range of a determined accurate time, CoST server 170 generates a list of data processing systems conforming to the criteria and returns the list of data processing systems to requestor 180. The requester may then select a desired data processing system from the returned list of data processing systems. For example, a requester may desire a data processing system having a maximum drift of 10 nanoseconds from a determined accurate time for performing time sensitive applications such as, but not limited to, performing financial transactions at a guaranteed time. The request from requester 180 may be generated by, but is not limited to, an automated process and/or a user request. Additionally, in some embodiments, CoST server 170 may reserve a data processing system from the returned list of data processing systems for requester 180. For example, requestor 180 may desire to use a specified data processing system from the returned list of data processing systems at a specified time, thus, requester 180 may request CoST server 170 reserve, i.e., guarantee, that the specified data processing system will be available for use by requester 180 at the specified time. In some embodiments, requestor 180 may also specify to CoST server 170 a reason and/or an amount of time requester 180 desires use of a specified data processing system in reserving the specified data processing system. CoST server 170 may use this information, along with other data, to determine whether reserving the specified data processing system at the specified time is possible. If CoST server 170 reserves the specified data processing system for requestor 180, CoST server 170 will deny use/requests for the specified data processing system that conflict with the reservation.

In the depicted example, network 190 represents the Internet. The Internet is a collection of networks and gateways that uses a variety of data transmission protocols to connect millions of computers together globally, forming a massive network in which any computer can communicate with any other computer as long as they are both connected to the Internet. At the heart of the Internet is a backbone of high-speed data communication lines between major nodes or host computers, consisting of thousands of commercial, governmental, educational and other computer systems that route data and messages. Of course, network 190 may also be implemented as a number of different types of networks, such as for example, an intranet, a local area network (LAN), or a wide area network (WAN). FIG. 1 is intended as an example, and not as an architectural limitation for the different illustrative embodiments.

FIG. 2 illustrates an embodiment of a data processing system in which an embodiment of a certified system time application may be implemented. The data processing system of FIG. 2 may be located and/or otherwise operate at any node of a computer network, such as the network illustrated in FIG. 1 (e.g., at clients 110, 120 and/or 130, at servers 140, 150 and/or 170, at requester 180, etc.). In this embodiment, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

FIG. 3 illustrates an embodiment of a certification of system time (CoST) application 300. In some embodiments, CoST application 300 comprises a CoST server application 310 and a CoST client application 350. CoST server application 310 is executed on a data processing system such as, but not limited to, CoST server 170 as depicted in FIG. 1. In some embodiments, CoST server application 310 may comprise a client monitor 312, a time synchronizer 314, a CoST validator 318, and a history database 316. History database 316 may be any type of local or remote data store. History database 316 comprises data associated with one or more monitored data processing systems, i.e., CoST monitor data. As will be further described, in some embodiments, CoST monitor data may comprise the system times, drift ranges, synchronization data of any time synchronization events, and tracking data of any user-driven system time changes to one or more monitored data processing systems. Further, in some embodiments, history database 316 may be accessible to only CoST server application 310. Alternatively, in some embodiments, history database 316 may be independent of CoST server application 310 and/or accessible by other applications.

In some embodiments, client monitor 312 monitors the accuracy of the system time of one or more monitored data processing systems, such as, but not limited to, Clients 110, 120, and 130. For example, in some embodiments, client monitor 312 may automatically retrieve the system times of the monitored data processing systems at predefined intervals for verifying the accuracy of the system times. Alternatively, in some embodiments, the monitored data processing systems may initiate the connection with CoST server 170 for transmitting their respective system times.

Time synchronizer 314 may be used to synchronize a time such as, but not limited to, the system time associated with CoST server 170 with a trusted time source such as, but not limited to, trusted time source 380. Trusted time source 380 may be, but is not limited to, a time server on the network or the Internet, a connected radio clock, or an atomic clock. In some embodiments, the trusted time source 380 may be traceable to an official time keeping authority such as the National Institute of Standards and Technology (NIST) which maintains the NIST's Internet Time Service. Thus, the time maintained by the trusted time source 380 may be guaranteed within a specified drift range from the time maintained by the Internet Time Service. In some embodiments, time synchronizer 314 may synchronize time with one or more time sources.

CoST validator 318 determines the accuracy of the system time of one or more monitored data processing systems. For example, in some embodiments, upon receiving a system time from a data processing system, CoST validator 318 compares the system time of the data processing system to a trusted time to generate a drift range for the data processing system and stores the drift range associated with the data processing system in a database. The drift range is determine by calculating the difference between the received system time of the data processing system and a trusted time such as, but not limited to, the time indicated by trusted time source 380. Further, in some embodiments, CoST validator 318 verifies that the system times of the monitored data processing systems are within a maximum drift range of a trusted time. The maximum drift range may be predefined such as, but not limited to, plus or minus 3 seconds. In some embodiments, CoST validator 318 may store a certificate of accuracy received from a trusted time source 380 every time a system time is synchronized. The certificate of accuracy includes information about the trusted time source, such as the IP address of the trusted time source, a security certificate or electronic seal confirming the authenticity and time of the trusted time source, and security information confirming the certificate of accuracy. CoST validator 318 may use the certificate of accuracy to identify the time source, and to confirm the authenticity of the time source. In embodiments wherein the trusted time source 318 obtains its system time from another, or an original trusted time source, the certificate of accuracy of the trusted time source 318 includes another certificate of accuracy of the another, or the original trusted time source, thus providing traceability to an official bureau of standards. In some embodiments, CoST validator also may be used to certify a timestamp generated by a monitored data processing system as discussed in greater detail below.

CoST client application 350 is executed on a client data processing system such as, but not limited to, clients 110, 120 and 130. In some embodiments, CoST client application 350 may comprise a time tracker 352, a CoST updater 354, a log file 357, and a CoST viewer 362. CoST updater 354 securely connects with CoST server 170 at predetermined intervals to transmit data such as, but not limited to, the system time, user driven system time changes, and/or synchronization data of any time synchronization events associated with client 110, and certificates of accuracy received from a trusted time source. In some embodiments, CoST updater 354 may connect with CoST server 170 in response to the occurrence of any user driven system time changes and/or time synchronization events for transmitting the respective data.

In some embodiments, time tracker 352 monitors for the occurrence of any user driven system time changes and/or time synchronization events. For example, time tracker 352 may be used to monitor for any manual attempts to change the system time and/or actual changes to the system time of client 110. In some embodiments, time tracker 352 may log information associated with any manual attempts to change the system time, and/or actual changes to the system time of client 110 in log file 357. In some embodiments, log file 357 comprises the time, date, and username of the person who attempted to change and/or changed the system time. Further, in some embodiments, log file 357 may also comprise the original system time and the modified system time.

In addition, in some embodiments, log file 357 may log a time associated with every occurrence of retrieving the system time. For example, in some embodiments, the "getSystemTime" command may be called to return the system time. Further, in some embodiments, the "getSystemTime" command may be called when a timestamp is generated for a file and/or document. Thus, in some embodiments, log file 357 may contain every occurrence of when the system time is retrieved for generating a timestamp associated with a particular data processing system such as, but not limited to, client 110. Therefore, as will be further described, in some embodiments, log file 357 may be used to verify the authenticity of a timestamp associated with a particular data processing system. Log file 357 may also include a certificate of accuracy received from CoST server 170.

Log file 357 may be encrypted, read-only, and/or stored in a secure location to prevent unauthorized access and/or alterations. In some embodiments, log file 357 is stored in a remote location from client 110. Log file 357 may be transmitted to CoST server 170 during the predetermined transmission intervals and/or may be remotely accessed by CoST server 170.

In addition, in some embodiments, CoST client application 350 may comprise a CoST viewer 362. CoST viewer 362 may be used to access and view data stored in history database 316 associated with the monitored data processing system, e.g., client 110. In some embodiments, the stored data may be downloaded to the monitored data processing system.

Further, in some embodiments, any communication between CoST server 170 and client 110 may be encrypted when the client-server communication channel is not trusted. This may involve making use of any of the available cryptographic protocols such as, but not limited to, Secure Sockets Layer (SSL) for encrypting the communications between client 110 and CoST server 170. It should also be understood that one or more data processing systems may comprise trusted systems. For example, in some embodiments, one or more data processing systems (e.g., CoST server 170, clients 110, 120 and 130, etc.) may be configured to conform to trusted and security standards set forth by, for example, the Trusted Computing Group and/or the Trusted Computer System Evaluation Criteria (TCSEC), thereby ensuring that any application running/executing on the trusted system also meets the trusted criteria.

Figure 4:
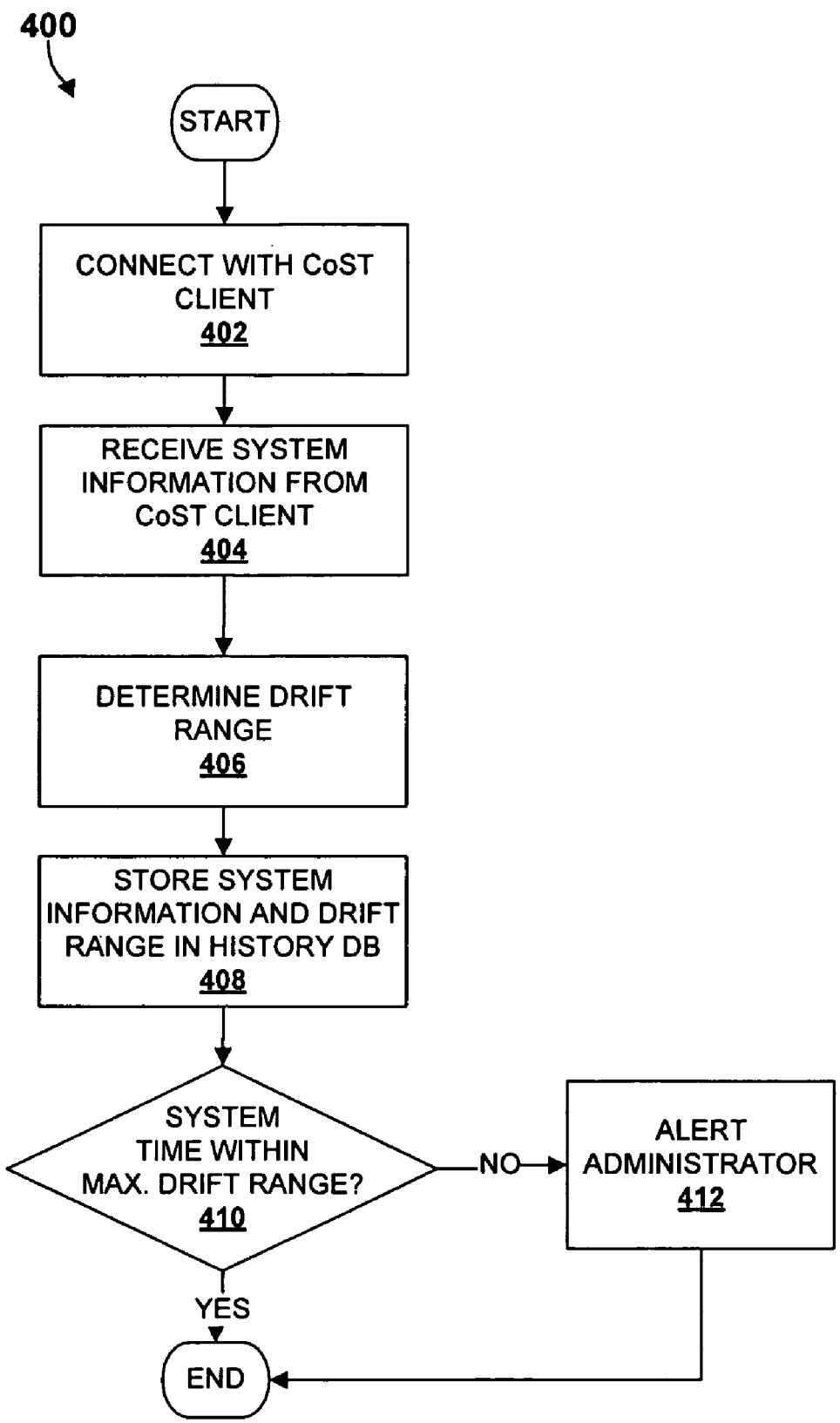
FIG. 4 is an embodiment of a process for monitoring a system time of a data processing system.

FIG. 4 is an embodiment of a process 400 for monitoring a system time of a data processing system. Process 400 may be executed by a data processing system such as, but not limited to, CoST server 170 and/or data processing system 200. Process 400 begins by connecting with a CoST client, i.e., a monitored data processing system, at block 402. At block 404, the process receives system information such as, but not limited to, the system time, user driven system time changes, and/or synchronization data of any time synchronization events associated with the CoST client. Using the received system information, the process compares the system time to a trusted time (e.g., as indicated by trusted time source 380) to determine an amount of drift between the system time of the CoST client and the trusted time. Further, one or more drift values may be used to generate a drift range (e.g., a maximum drift, plus and/or minus, relative to a trusted time) for the CoST client at block 406. At block 408, the process stores the received system information and the drift range associated with the CoST client in a database such as history database 316. In some embodiments, the process determines, at block 410, whether the system time of the CoST client is within a maximum drift range of the trusted time as indicated by trusted time source 380. If the system time of the CoST client is within the maximum drift range of the trusted time, process 400 terminates. However, in some embodiments, if the system time of the CoST client is not within the maximum drift range of the trusted time, the process alerts a system administrator at block 412, with the process terminating thereafter. For example, in some embodiments, the process, at block 412, may send an email to the system administrator alerting him/her that the system time of the CoST client is not within the maximum drift range.

Figure 5:
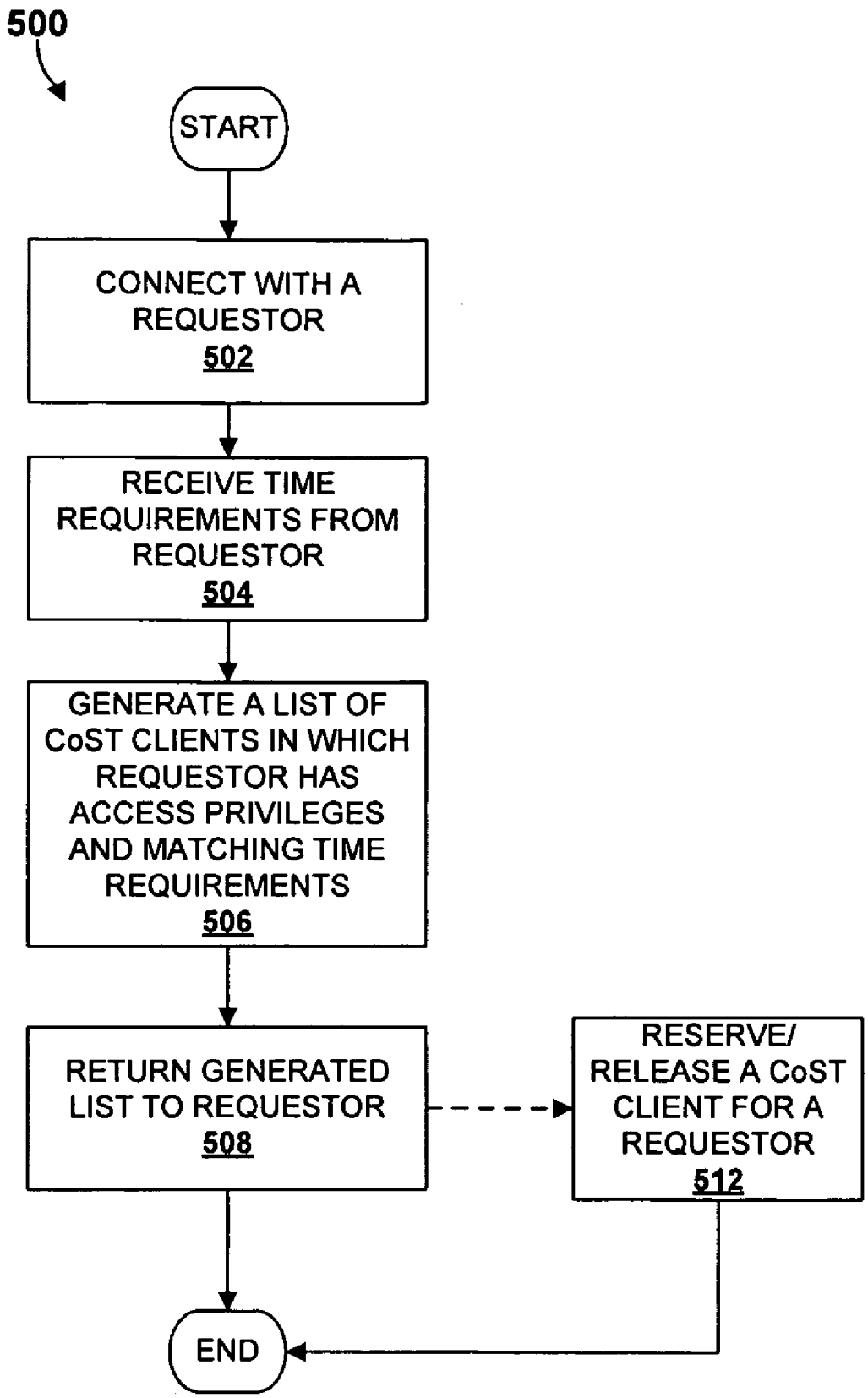
FIG. 5 is an embodiment of a process for generating a list of data processing systems conforming to a requested criteria.

FIG. 5 is an embodiment of a process 500 for generating a list of data processing systems conforming to a requested criteria of a requester. Process 500 may be executed by a data processing system such as, but not limited to, CoST server 170 and/or data processing system 200. Process 500 begins by connecting with a requester such as, but not limited to, requester 180 at block 502. The process receives time requirements, i.e., a criteria, from the requester at block 504. For example, requestor 180 may request from CoST server 170 a data processing system having a system time having a maximum drift of plus or minus ten microseconds from an accurate or trusted time. In addition to or in place of a maximum drift range, the requesting criteria may include, but is not limited, a time zone of operation associated with a monitored data processing system and/or a preferred time synchronization protocol on the monitored data processing system. At block 506, the process generates a list of CoST clients in which the requestor has access privileges and matching the requested system time criteria. The process returns the generated list to the requester at block 508, with the process terminating thereafter. Additionally, in some embodiments, CoST server 170 may reserve a CoST client for a requester and/or release a previously reserved CoST client at block 512, with the process terminating thereafter.

FIG. 6 is an embodiment of a process 600 for certifying a timestamp generated by a monitored data processing system. Process 600 may be executed by a data processing system such as, but not limited to, CoST server 170 and/or data processing system 200. Process 600 begins by connecting with a requester such as, but not limited to, requester 180 at block 602. The process receives, at block 604, a request to certify a timestamp generated by a monitored data processing system of CoST server 170. At block 606, the process determines the CoST client that generated the timestamp. The process determines whether at the time of generating the timestamp, the system time of the CoST client was within a maximum drift range of the determined trusted time at block 610. For example, the process may use the data in history database 316 to determine whether the last stored system time prior to the timestamp was within the maximum drift range. If the system time of the CoST client was not within a maximum drift range of the determined trusted time, the process returns an indication to the requester that the timestamp is unable to be certified at block 616, with the process terminating thereafter. However, if the system time of the CoST client was within a maximum drift range at the time of generating the timestamp, the process determines whether any changes to the system time of the CoST client were made between the time of the last verified system time and the time of generating the timestamp at block 612 (e.g., by reviewing/analyzing log file 357). For example, in some embodiments, process 600 may determine if any manual changes to the system time occurred between the time of the last verified system time and the time of generating the timestamp. If a change to the system time occurred during that time period, the process returns an indication to the requester that the timestamp is unable to be certified at block 616, with the process terminating thereafter. However, if the system time was not modified during that time period, in some embodiments, the process checks a log file such as, but not limited to, log file 357 to determine whether the log file contains an entry of retrieving the system time (i.e., "getSystemTime" command) matching a time of the timestamp at block 613. This step may be performed to ensure that the data processing system associated with the time stamp is actually the correct data processing system. If the log file does not contain a matching time entry, the process returns an indication to the requestor that the timestamp is unable to be certified at block 616, with the process terminating thereafter. However, if the log file does contain a matching time entry, the process returns a certification of the timestamp to the requester at block 614, with the process terminating thereafter. Further, in some embodiments, a specific reason for not being able to certify the timestamp may be returned to the requester.

Thus, in the embodiment described in connection with FIG. 6, various criteria are used, either alone or in combination, to determine whether to certify a timestamp generated by a monitored data processing system. For example, in some embodiments, historical data from history database 316 related to the data processing system that generated the timestamp is analyzed and/or evaluated to determine the trustworthiness of the timestamp. In some embodiments, the historical data may be used to determine when system time synchronization events took place to synchronize the data processing system to a trusted time. In some embodiments, the historical data may be analyzed and/or evaluated to determine the source of the system time traceable to an official bureau of standards for maintaining an official time source such as the NIST. In some embodiments, the historical data may be analyzed and/or evaluated to determine when user driven or manual changes to the system time of the monitored data processing system took place. In some embodiments, any user driven or manual change to the system time may result in the inability to certify the timestamp. In other embodiments, if no user driven or manual changes to the system time of the data processing took place subsequent to the last occurring time synchronization event, the timestamp is considered trustworthy and certified.

Accordingly, the disclosed embodiments present a system, computer program product, and method for providing data processing systems with certified system times. In addition, the disclosed embodiments present a system, computer program product, and method for certifying a timestamp generated by a monitored data processing system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiment was chosen and described in order to best explain the principles of the invention and the practical application, and to enable others of ordinary skill in the art to understand the invention for various embodiments with various modifications as are suited to the particular use contemplated.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method comprising:
    receiving a request to certify a timestamp, the timestamp generated by a trusted data processing system;
    responsive to the request, analyzing historical data related to a system time of the data processing system; and
    certifying the timestamp in response to determining that the historical data indicates a trustworthy system time of the data processing system when the timestamp was generated and determining an absence of a user driven change to the system time of the data processing system.

2. The computer implemented method of claim 1, further comprising certifying the timestamp in response to determining that a drift range of a system time of the data processing system was within a criteria at the time the timestamp was generated.

3. The computer implemented method of claim 1, further comprising certifying the timestamp in response to determining an absence of a user driven change to the system time of the data processing system occurring subsequent to a time synchronization event of the data processing system to a trusted time.

4. The computer implemented method of claim 1, wherein analyzing the historical data comprises determining when a time synchronization event to a trusted time last occurred for the data processing system prior to the timestamp generation.

5. The computer implemented method of claim 4, wherein analyzing the historical data comprises determining whether a user driven change to the system time of the data processing system occurred subsequent to the time synchronization event.

6. The method of claim 1, wherein analyzing the historical data comprises determining a maximum drift range of the system time for the data processing system relative to a trusted time.

7. A system comprising:
    a data bus system;
    memory coupled to the data bus system, wherein the memory includes computer usable program code; and
    a processing unit coupled to the data bus system, wherein the processing unit executes the computer usable program code to:
        responsive to a request to certify a timestamp, the timestamp generated by a trusted data processing system, analyze historical data related to a system time of the data processing system; and
        certify the timestamp in response to determining that the historical data indicates a trustworthy system time of the data processing system when the timestamp was generated and determining an absence of a user driven change to the system time of the data processing system.

8. The system of claim 7, wherein the processing unit further executes computer usable program code to certify the timestamp in response to determining that a drift range of a system time of the data processing system was within a criteria at the time the timestamp was generated.

9. The system of claim 7, wherein the processing unit further executes computer usable program code to certify the timestamp in response to determining an absence of a user driven change to the system time of the data processing system occurring subsequent to a time synchronization event of the data processing system to a trusted time.

10. The system of claim 7, wherein the processing unit further executes computer usable program code to determine when a time synchronization event to a trusted time last occurred for the data processing system prior to the timestamp generation.

11. The system of claim 10, wherein the processing unit further executes computer usable program code to determine whether a user driven change to the system time of the data processing system occurred subsequent to the time synchronization event.

12. The system of claim 7, wherein the processing unit further executes computer usable program code to determine a maximum drift range for the system time of the data processing system relative to a trusted time.

13. A computer program product comprising:
    a computer usable storage medium including computer usable program code executable by a computer for certifying a timestamp of a trusted data processing system, the computer program product comprising computer usable program code for:
        responsive to a request to certify a timestamp, the timestamp generated by a trusted data processing system, analyzing historical data related to a system time of the data processing system; and
        certifying the timestamp in response to determining that the historical data indicates a trustworthy system time of the data processing system when the timestamp was generated and determining an absence of a user driven change to the system time of the data processing system.

14. The computer program product of claim 13, wherein the computer usable medium includes computer usable program code for certifying the timestamp in response to determining that a drift range of a system time of the data processing system was within a criteria at the time the timestamp was generated.

15. The computer program product of claim 13, wherein the computer usable medium includes computer usable program code for certifying the timestamp in response to determining an absence of a user driven change to the system time of the data processing system occurring subsequent to a time synchronization event of the data processing system to a trusted time.

16. The computer program product of claim 13, wherein the computer usable medium includes computer usable program code for determining when a time synchronization event to a trusted time last occurred for the data processing system prior to the timestamp generation.

17. The computer program product of claim 16, wherein the computer usable medium includes computer usable program code for determining whether a user driven change to the system time of the data processing system occurred subsequent to the time synchronization event.

18. A computer implemented method comprising:
    receiving from a first data processing system a request to certify a timestamp generated by a second data processing system;
    responsive to the request, analyzing historical data related to a system time of the second data processing system; and
    certifying the timestamp in response to determining that the historical data indicates a trustworthy system time of the second data processing system when the timestamp was generated.

19. The method of claim 18, further comprising, responsive to the request, determining the second data processing system that generated the timestamp.

20. The method of claim 18, further comprising certifying the timestamp in response to determining an absence of a user driven change to the system time of the second data processing system.

21. The method of claim 18, further comprising certifying the timestamp in response to determining an absence of a user driven change to the system time of the second data processing system occurring subsequent to a time synchronization event of the second data processing system to a trusted time.

22. A computer implemented method comprising:
    receiving a request to certify a timestamp, the timestamp generated by a data processing system;
    responsive to the request, analyzing historical log data related to a system time of the data processing system; and
    certifying the timestamp in response to determining that the historical log data contains a command entry indicating retrieval of a system time corresponding to a time the timestamp was generated.

23. The method of claim 22, further comprising certifying the timestamp in response to determining an absence of a user driven change to the system time of the data processing system.

24. The method of claim 22, further comprising certifying the timestamp in response to determining an absence of a user driven change to the system time of the data processing system occurring subsequent to a time synchronization event of the data processing system to a trusted time.

\* \* \* \* \*